United States Patent
Taleyarkhan

(10) Patent No.: US 11,243,315 B2
(45) Date of Patent: Feb. 8, 2022

(54) **LOW-COST, LIGHT-WEIGHT HIGH EFFICIENCY (H*10 CAPABLE) NEUTRON SPECTROMETRIC DETECTOR-DOSIMETER**

(71) Applicant: Rusi P Taleyarkhan, Lafayette, IN (US)

(72) Inventor: Rusi P Taleyarkhan, Lafayette, IN (US)

(73) Assignee: Rusi P. Taleyarkhan, Lafayette, IN (US)

( * ) Notice: Subject to any disclaimer, the term of this patent is extended or adjusted under 35 U.S.C. 154(b) by 27 days.

(21) Appl. No.: 16/776,512

(22) Filed: Jan. 30, 2020

(65) Prior Publication Data
US 2021/0239864 A1    Aug. 5, 2021

(51) Int. Cl.
G01T 3/00    (2006.01)

(52) U.S. Cl.
CPC .................. *G01T 3/00* (2013.01)

(58) Field of Classification Search
CPC .......................................... G01T 3/00
See application file for complete search history.

(56) References Cited

U.S. PATENT DOCUMENTS

| | | | |
|---|---|---|---|
| 9,194,966 B2 | 11/2015 | Taleyarkhan | |
| 2006/0269033 A1* | 11/2006 | Taleyarkhan | G01T 1/167 376/153 |
| 2009/0296871 A1* | 12/2009 | Taleyarkhan | G01T 1/167 376/153 |
| 2011/0174990 A1* | 7/2011 | Taleyarkhan | G01T 1/12 250/473.1 |
| 2015/0212212 A1* | 7/2015 | Taleyarkhan | G01T 1/178 250/335 |
| 2016/0025872 A1* | 1/2016 | Taleyarkhan | G01N 23/00 250/390.04 |
| 2017/0248707 A1* | 8/2017 | Taleyarkhan | G01T 5/00 |
| 2018/0210098 A1 | 7/2018 | Taleyarkhan | |

OTHER PUBLICATIONS

R. P. Taleyarkhan, B. Archambault, A. Sansone, T.F. Grimes, A. Hagen Novel, Neutron spectroscopy & H*10 dosimetry with tensioned metastable fluid detectors, Elsevier B.V. Journal, Dec. 23, 2019, pp. 1-17, USA.

T.F. Grimes, R.P. Taleyarkhan, Fast neutron spectroscopy with tensioned metastable fluid detector, Elsevier B.V. Journal, May 30, 2016, pp. 1-11, USA.

Susan Gallier, Purdue Collaboration Yields Promising Neutron Dosimeter, Nuclear News Magazine, Jun. 2019, pp. 29-33, USA.

* cited by examiner

*Primary Examiner* — Marcus H Taningco
(74) *Attorney, Agent, or Firm* — Pervin Rusi Taleyarkhan

(57) ABSTRACT

Systems and methods for neutron detection using tensioned metastable fluid detectors, using multi-atom spectroscopy approach.

9 Claims, 8 Drawing Sheets

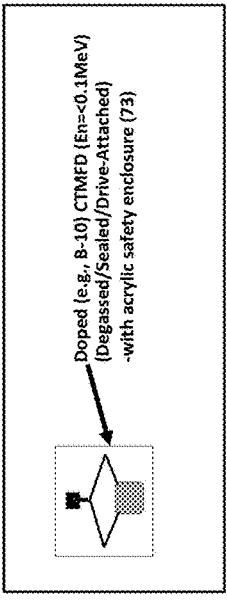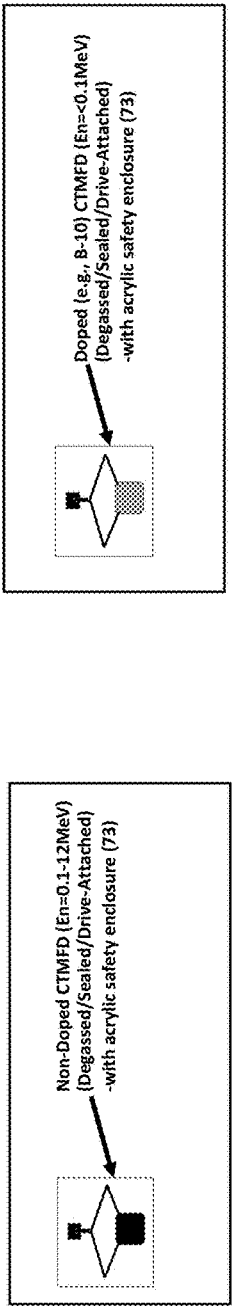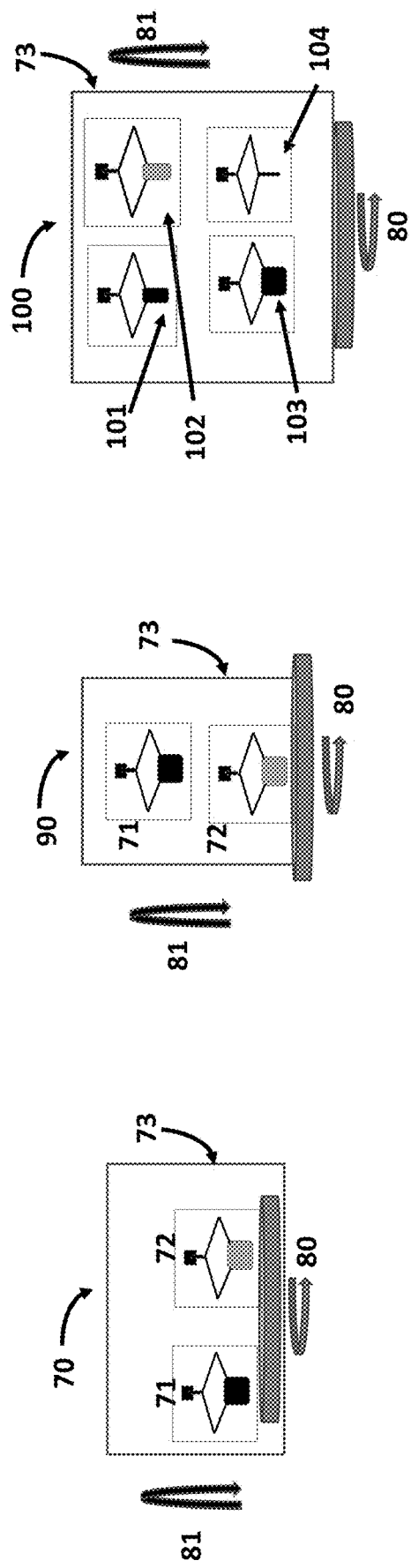
FIG.6A FIG.6B FIG.6C FIG.6D FIG.6E

LOW-COST, LIGHT-WEIGHT HIGH EFFICIENCY (H*10 CAPABLE) NEUTRON SPECTROMETRIC DETECTOR-DOSIMETER

GOVERNMENT SUPPORT CLAUSE

This invention was made with Government support under Subcontract No. 4000157714 awarded by Oak Ridge National Laboratory under Contract No. DE-AC05-00OR22725 awarded by the United States Department of Energy. The government has certain rights in the invention.

TECHNICAL FIELD

The present application relates to systems and methods for energy spectrometric neutron detection and radiation health physics related H*10 radiation dose, and in particular to methods and apparatus configurations which use variably-sized-loaded tensioned metastable fluid detectors.

BACKGROUND

This section introduces aspects that may help facilitate a better understanding of the disclosure. Accordingly, these statements are to be read in this light and are not to be understood as admissions about what is or is not prior art.

Spectroscopic neutron detection is of importance in numerous arenas ranging from basic sciences to nuclear energy, to radiation health physics, to safeguards and security. Tension Metastable Fluid Detectors (TMFD) are quite unlike commonly-used neutron detectors. Among the benefits they offer are: high intrinsic efficiency for both fast and thermal neutrons, on-off times on the order of microseconds to allow phase locking with timed neutron-photon sources for active interrogation, photon-electron rejection, to vastly decrease interfering background, and also allow active photon interrogation, source direction-position sensing, alpha and fission product monitoring, and the potential to offer neutron multiplicity information, the ability to change sensitivity on demand, all of such features potentially at reduced cost and complexity compared to currently available solutions. Despite the aforementioned attributes, the utility of TMFDs in neutron dose measurements with and without spectrometry requires information on the response function, i.e., relating the negative (sub-vacuum) tensioned pressure (Pneg) state of the detector with the localized energy added (by the incident radiation over nanometer scale track lengths) to then enable to nucleate bubbles per nucleation theory in metastable fluids and causing a Cavitation Detection Event (CDE). The often-used Seitz's Thermal Spike Theory (TST) which robustly predicts CDEs for thermally superheated metastable fluids as in bubble chambers, fails significantly when applied to tensioned (room temperature) state fluids to describe the manifestation of CDEs. As a result, applying TST to predict outcomes from TMFD experiments results in far more predicted CDEs than actually observed experimentally. Therefore, there is an unmet need for a system, methodology, and apparatus that overcomes the aforementioned limitations.

BRIEF DESCRIPTION OF DRAWINGS

FIG. 6A shows a 1-CTMFD configuration with non-doped unit for enabling H*10 neutron dosimetry covering the fast (~0.1+ MeV) neutron energy range.

FIG. 6B shows another embodiment of a 1-CTMFD array configuration with doped unit for enabling H*10 neutron dosimetry covering epithermal (<~0.1 MeV) neutron energy range.

FIG. 6C shows an embodiment of a 2-CTMFD array configuration with doped and non-doped units on a moving platform for enabling H*10 neutron dosimetry covering the entire thermal to fast neutron energy ranges under low to moderate radiation intensity.

FIG. 6D shows another embodiment of a 2-CTMFD array configuration with doped and non-doped units on a moving platform for enabling H*10 neutron dosimetry covering the entire thermal to fast neutron energy ranges under ultra-low to moderate radiation intensity.

FIG. 6E shows an embodiment of a 4-CTMFD array configuration with doped and non-doped units on a rotating platform for enabling H*10 neutron dosimetry covering the entire thermal to fast neutron energy ranges covering ultra-low to high radiation intensity.

SUMMARY

Figure 1:
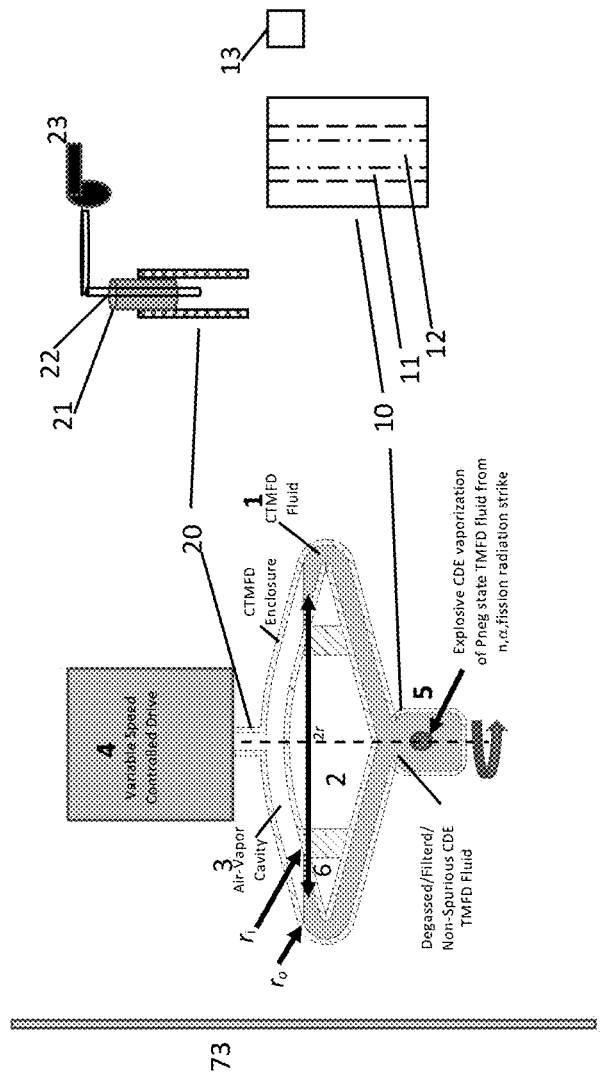
FIG. 1 is a schematic representation of a Centrifugally Tensioned Metastable Fluid Detector (CTMFD) sensor system according to the present disclosure.

In at least one embodiment, presented herein are method and apparatus configurations, including single and a plurality of TMFD sensors of various sizes and sensing fluid-composition (each size TMFD with a size specific [RM] to account for experimentally-derived fluid field related Pneg and fluid-structure interaction issues influencing detection) deploying Pneg states ranging from 0-12 bar in segmented fashion, that enable H*10 dosimetry from the thermal (0.02 eV) to fast (0.1 to high MeV) range neutron radiation alongside the abilities to use low-cost, safe (nonflammable, non-reactive, non-hazardous) sensing fluids, while offering high sensitivity and gamma-beta blind operation to enable dosimetry even under ultra-low radiation fields (e.g., 5 micRem/h) and also for high (Rem/h) fields—which furthermore, allows for application by extension to any TMFD sensing fluid in which a significant amount of the atoms of the molecules of the fluid can contribute for causing detection events.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In at least one aspect of the present disclosure, a novel approach to identify a response function [RM] that is specific to and relates to the tension state of the Centrifugally Tensioned Metastable Fluid Detection (CTMFD) of a given size using a multi-atom significant decafluoropentane (DFP) ($C_5H_2F_{10}$) sensing fluid with the amount of energy deposited (by incoming radiation over nanometer scales) to the propensity to generate a Cavitation Detection Event (CDE) is disclosed.

Further description of the basic features of the CTMFD is provided in U.S. Pat. No. 9,194,966 to Taleyarkhan, incorporated by reference in its entirety into the present disclosure. Further, in the earlier published disclosure (U.S. Pat. Pub. No. US 2018/0210098 A1 for Taleyarkhan), we have described in detail the special-case theoretical approach referred to as single-atom-spectroscopy (SAS) which overcomes the TST limitations described above, resulting in development of a response matrix (RM) which connects tensioned metastable pressure (Pneg) states of the TMFD's sensing fluid to manifested rates of neutron detection of neutrons of various energies emitted from a single fast neutron source at a specific location with surrounding structures and at a certain specific distance from the CTMFD using heptane as the sensing fluid. The SAS approach features limited detection fluids to ones in which only one of the constituent atoms influenced the generation of a CDE; as also, for applying to fast neutron energies only and of utility for the specific source-CTMFD configuration only. This limits the range of fluid types and the energy range of neutrons, and consequently, the intrinsic detection efficiency as well.

Therefore, in the present disclosure, we describe features pertaining to the development of a thermal-to-fast neutron energy spectroscopic neutron detectors which allows for use any arbitrary sensing fluid in which multiple atom recoils can play a role in the generation of a CDE—thereby, enabling multi atom spectroscopy (MAS), leading to the design and qualification of the general-purpose H*10-TMFD spectroscopic neutron sensor and dosimeter.

The ability to perform H*10 neutron dosimetry, for a certain intensity level, requires knowledge of the neutron energy spectrum ranging from thermal (0.02 eV) to fast (10+ MeV) energies for neutron radiation entering into a body; tensioned metastable fluid detectors (TMFDs) can offer benefits in terms of time, cost, weight, operation, ability to remain blind to intervening gamma-beta background, ability to conduct dosimetry even under ultra-low and high radiation fields, in comparison to and overcoming limitations of state-of-art systems like bonner sphere spectrometers (BSS) or the so-called rotating spectrometer (ROSPEC) device types. TMFDs function by detecting neutrons and other radiation types by placing sensing fluids in various levels of tensioned (negative) pressure—Pneg states.

In another aspect of the present disclosure, methods and variably scaled-arrayed-doped (and undoped) TMFD apparatus configurations are presented for deriving a novel, rapid turnaround, thermal-to-fast neutron energy, continuous and pulsed neutron-spectroscopy enabled H*10 dosimetry capable (gamma-beta blind), high intrinsic efficiency sensor system using TMFD architecture. Unlike for conventional gamma-beta radiation where the quality weight-factor ($w_r$)=1 and, is invariant with energy, for neutrons it is highly non-linear (varying from 2 towards 20), wherein the induced neutron dose date per unit neutron flux increases ~100 times with neutron energy from eV to MeV; this must be accounted for to avoid significant conservatisms (and resultant 10× type potential penalties) inherent in non-spectroscopic (aka, dumb) neutron detector-survey meters. H*10 neutron dosimetry requires knowledge of the neutron radiation energy spectrum and the quality weight factor ($w_r$) or energy specific differential flux-DF(E) multiplier (rem/h)/(n/cm²-s) associated with neutrons of a given energy—which are well-established quantities from the Intl. Comm. Rad. Protection (ICRP) and similar organizations. A sample of such is summarized from ICRP in Table 1 below:

TABLE 1

| Neutron energy (MeV) | DF(E) – (rem/h)/(n – cm² – s) | Quality factor |
|---|---|---|
| $2.5 \times 10^{-8}$ to $10^{-3}$ | $\sim 4 \times 10^{-6}$ | 2 |
| 0.01 | $\sim 3.6 \times 10^{-6}$ | 2 |
| 0.1 | $2.1 \times 10^{-5}$ | 7.4 |
| 1 | $1.2 \times 10^{-4}$ | ~11 |
| 5 to 10 | $1.47 \times 10^{-4}$ | ~8 |
| 20 | $1.54 \times 10^{-4}$ | ~6 |

When the differential neutron intensity energy spectrum is known and multiplied by DF(E) for each energy bin, over the energy range of interest, one then gets the actual effective H*10 neutron dose. Since DF(E) is established, this requires the need to find the neutron energy spectrum.

Neutron spectroscopy determination requires one to derive a so-called response matrix (RM) which allows one to acquire data in the form of a data vector [DV] at different set points vs neutron energy (e.g., count rate vs energy bin for different Pneg states for TMFDs, and for different sized moderator balls as for BSS) relating to the commensurate neutron radiation energy vector [EV] such that [DV]=[RM]× [EV]. Thereafter, [EV] can be derived via matrix inversion or via iterative techniques to arrive at the relative neutron energy intensity spectrum and intensity [EV]=[RM]$^{-1}$× [DV]. Once [EV] is known for "i=1 to N" Pneg states, H*10 dose=sum of $EV_i \times DF(E)_i$.

In the past disclosure (U.S. Pat. Pub. No. US 2018/0210098 A1 for Taleyarkhan et al.) using TMFD technology, the [RM] was disclosed in single-atom-spectroscopy (SAS) mode using specific TMFD sensing (flammable) fluids such as heptane ($C_7H_{16}$) in which only a single (one) atom—carbon in this case dominated the detection neutron radiation and that too, for fast neutron energy above ~4 MeV because of high tensioned negative pressures (Pneg) required for detection. This past disclosure did not teach on use at varying ambient temperatures and apparatus pre-degassing. Neutron energy levels from fission and other isotope and also accelerator generators of neutrons typically span the range >0.1 MeV towards 14 MeV as well as down-scattered neutrons ranging down towards the 0.02 eV (thermal) range. For example, nuclear fission from U or Pu results in a spectrum which peaks at ~0.8 MeV and a large (over 80%) of the neutrons are well below 4 MeV. Also, in the past disclosure, the method for [RM] determination was applied to recognize the [EV] of a specific source at a specific location and not for establishing the actual neutron energy spectrum for neutron radiation at any arbitrary position—which may be from a single or multitude of sources and source types. For field use the H*TMFD apparatus must have the ability to operate in a range of ambient temperature conditions such that dynamic temperature compensation is included. Furthermore, the TMFD sensing fluid must also be sufficiently degassed through the upper limit Pneg of the TMFD, to avoid spurious detection events caused by dissolved gas like air, impurity (motes), and significant moisture contaminant. Once appropriately degassed, the apparatus must also be in a sealed state to avoid external gas ingress. Prior art does not teach on method and construction of TMFDs that can allow for operation without degassing each time it is started for data gathering and also to dynamically permit detection efficiency temperature compensation. Conducting H*10 dosimetry is not possible under such limitations.

Therefore, in yet another aspect the present disclosure provides methods, configurations, and apparatuses to enable tensioned metastable fluid detectors (TMFDs) that enables H*10-neutron dosimetry, a unique, general purpose Multi Atom Spectroscopy (MAS). The MAS based RM development and methods for use in segmented form with single and multiple TMFDs (degassed-sealed-temperature compensated, without spurious cavitation from non-neutron radiation) to allow neutron spectroscopy over the sub-eV (thermal) to fast (MeV) range constitutes a major advancement over single-atom-spectroscopy (SAS) for which description is provided in the aforementioned U.S. Pat. Pub. No. 2018/0210098 A1 for Taleyarkhan et al., incorporated by reference in its entirety into the present disclosure.

TMFDs can be visualized as operating in a way similar to rupturing a stretched material. The more one stretches the easier it becomes to cause a rupture with the aid of a stimulus providing excess energy to break apart the stretched material (e.g., poking with stretched rubber band with a needle). In TMFDs the fluid space is stretched such that neutrons or other recoiling ions deposit the required excess energy to lead to a tensioned metastable fluid space cavitation event (i.e., a CDE). The CTMFD sensor works by inducing tensioned metastable states in fluids utilizing centrifugal forces. FIG. 1 provides a schematic illustration of a generic CTMFD and its key components, which includes an apparatus made (usually) from glass or quartz and configured into a diamond shape 1. The CTMFD is partially filled (over the arm bends) with a sensing fluid of density ($\rho$), and meniscus separation (2r) 2 with an air/vapor void cavity above 3. As to be expected due to surface tension the liquid meniscus in the upper arms is spread out as shown in FIG. 1. Therefore, "r" is the distance in between the inner and outer distances of the meniscus from the centerline as noted in FIG. 1. The glass enclosure is connected to a controlled drive source 4 that permits rotation around the central axis. When rotating, centrifugal force drives the fluid molecules outwards symmetrically, effectively tensioning the molecules in the central lower bulb. The level of tension or negative pressure $P_{neg}$ on the centerline is readily calculated (neglecting gravity head) using Bernoulli's well-known law for incompressible fluids, resulting in Eq. (1):

$$P_{neg}=2\pi^2\rho r^2 f^2 - P_{amb} \tag{1}$$

where, $\rho$=fluid density [kg/m³], r=fluid meniscus separation from the centerline [m], f=rotational speed [RPS], $P_{amb}$=ambient air pressure [Pa], and $P_{neg}$=Tensioned, negative pressure at centerline of the lower bulb in the CTMFD [Pa]. As a first order approximation, the pressure variation in the central bulb region can be modeled as the well-known "Couette" flow between two cylinders rotating with the same frequency where the inner cylinder has a radius of zero. This approximation reduces to the well-known Bernoulli equation (for incompressible flow assuming negligible gravitational head), and it becomes readily apparent that for a small sensitive volume bulb radius the pressure variation in the central bulb region is negligible. However, as the sensitive volume (SV) (i.e., lower bulb volume) gets larger and the bulb's radius itself becomes a significant component of the fluid meniscus separation radius from the centerline, the negative pressure variation within the SV can no longer be considered negligible and must be accounted for. The negative pressure at any point in the CTMFD must then be calculated by adjusting the fluid meniscus radius, as shown in Eq. (2):

$$P_{neg}=2\pi^2\rho(r-r')^2 f^2 - P_{amb} \tag{2}$$

where, r'=distance from axis of rotation [m].

For example, for a CTMFD where the sensing fluid is composed of decafluoropentane (DFP) which has the molecular formula "$C_5H_2F_{10}$" when the centerline negative pressure is 3.5 bar (i.e., 3.5 bar below vacuum pressure, for $\rho$=1,580 kg/m³, r=0.0635 m, r'=0, f=~60 & 100 Hz), the negative pressure (Pneg) at the wall (r'=13 mm) 40 of the CTMFD is ~1.8 bar. Since detection sensitivity depends on the Pneg value, this potentially stark variation of Pneg with "r'" means that a larger diameter SV need not proportionately offer greater sensitivity for detection if the required Pneg state for a given neutron energy has not yet been crossed. Since detection sensitivity depends on the Pneg value, this potentially stark variation of Pneg with "r'" means that a larger diameter SV need not proportionately offer greater sensitivity for detection if the required Pneg state for a given neutron energy has not yet been crossed. FIG. 2A illustrates such relationship. Hereafter, in the present disclosure, the quoted $P_{neg}$ is for r'=0; i.e., at the centerline.

When an external stimulus such as a neutron or alpha recoil interacts with the CTMFD's fluid in its sensitive volume (SV) 10, under the commensurate Pneg state an explosively formed cavitation detection event (CDE) 5 occurs which can then be detected by variety of means such as light beam cutoff, acoustic waves, etc. The SV size (and hence the sensitivity/efficiency) can be varied by either reducing the diameter 11, 12 or by combined reduction of both diameter and height 13.

Figure 2B:
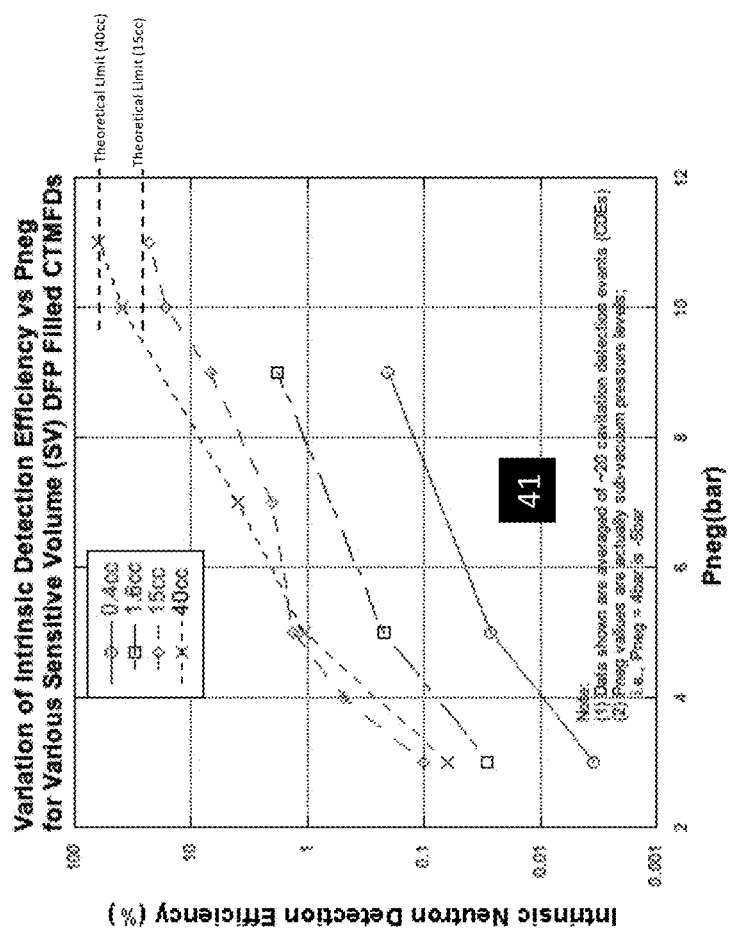
FIG. 2B depicts variation of intrinsic neutron detection efficiency with Pneg for SV sizes: from 0.4 cc to 40 cc.
Figure 2A:
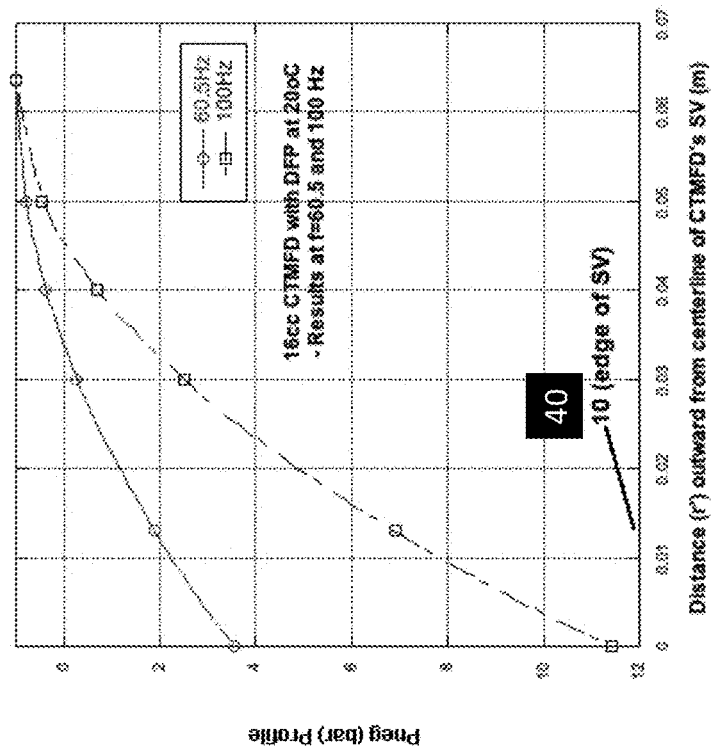
FIG. 2A depicts variation of Pneg with distance from the centerline.

The DFP sensing fluid based CTMFD offers high detection efficiencies 41 over a range of energies as shown in FIGS. 2A and 2B for data acquired with 0.4-40 cc SV units (non-borated). As noted therein, the intrinsic efficiency for a 40 cc SV approaches (~100% of the theoretical neutron interaction of) 60% when detecting neutrons emitted from a spontaneous fission isotope neutron source (Cf-252). On a per volume basis, the DFP based 40 cc CTMFD efficiency has been determined to be over 70× that for conventional moderated $BF_3$ detectors and over 1,000× that for other types—all the while also remaining 100% gamma-beta radiation blind. The Pneg dependent efficiency range is significant and is dependent on the Pneg state: ranging from ~$10^{-3}$% at Pneg~2 bar towards ~60% for Pneg~10 bar. This feature is taken advantage of as will be shown later in the present disclosure when deploying the H*10-TMFD for operations in ultra-low to high intensity radiation fields spanning the mic-Rem/h to multi Rem/h range. Detection efficiency (sensitivity) varies strongly with Pneg in non-linear fashion with various sized SVs as is noted in FIG. 2B. This is especially the case when we compare the profile of efficiency vs Pneg between the 40 cc SV and 16 cc SV cases. The variation of detection efficiency (sensitivity) varies strongly with Pneg in non-linear fashion with various sized SVs as is clearly noted in FIG. 2B. This is especially the case when we compare the profile of efficiency vs Pneg between the 40 cc SV and 16 cc SV cases.

Challenges in development of the RM for multi-atom spectroscopy (MAS): In past work with SAS the sensing fluid was necessarily chosen such that only the C atom in heptane ($C_7H_{16}$)—the sensing fluid dominates in terms of detection and the RM was developed under this restriction. Besides heptane being flammable (and the attendant handling issues), this choice severely restricted the neutron energy range of application and also the overall neutron detection efficiency due in part to the relatively high vapor pressure of heptane, and also because (i.e., proton) recoils could not be included for consideration in SAS spectroscopy. Single atom type neutron spectroscopy has been the industry norm (e.g., in proton-recoil NE-213 LS detectors, as well as for moderated $BF_3$ or He-3 based spectroscopy wherein (n, α) or (n, ρ) reaction energetics are relied upon for development of RMs). In order to enhance the detection efficiency (intrinsic as well as for extending the spectroscopy to cover an extended neutron energy range from $10^{-2}$ eV towards 20 MeV), the present disclosure teaches multi-atom-spectroscopy (MAS) with and without dissolved doped (e.g., B) atoms. The development of a robust MAS based RM for the CTMFD is complicated by the fact that neutrons of various energies can interact with the multiple nuclei of target atoms in several different ways inclusive of elastic-inelastic scattering and absorption and other nuclear reactions like (n, n), (n, charge particle production [e.g., (n, α)] and even fission. Even during scattering alone, neutrons can collide head-on or at other angles ranging from zero towards 180°. Besides this aspect, one also must take into account the fluid dynamic pressure and velocity distributions and the relative propensity to nucleate within the bulk and at wall-fluid interface regions. The simple Bernoulli-law representation for Pneg variations shown in Eqn. 1 do not account for such nuances in CTMFDs with various sized central bulb SVs. From a practical viewpoint for multi-atom spectroscopy as with CTMFDs requires high neutron detection efficiency engineered fluid such as decafluoropentane (DFP) which has the molecular formula $C_5H_2F_{10}$ which fortunately also exhibits excellent NFPA rating of "0,0,0" for health, reactivity and flammability—thereby overcoming transportation challenges as well. DFP's relative 100% higher density vs. heptane and acetone (~1.6 g/cc vs. 0.68 cc) allows attainment of desired Pneg states at ~40% lower rotational frequencies and also significantly helps with neutron interaction probability and therefore, detection efficiency. TMFDs have been shown to attain detection efficiencies approaching ~100% of theoretical interaction limits as reproduced in FIG. 2B for 40 cc and 15 cc SV cases. For DFP each of the three atoms (C, F, and possibly H) can now be allowed to impact the production of CDEs and especially also from numerous neutron reaction types with $^{19}F$ atoms; however, due to the large number of unknowns (esp., related to combined influences of complex rotational 3-D fluid dynamics, fluid-structure interactions, nuclear recoils and geometry effects) it is found necessary from trial-error (i.e., the RM developed for 16 cc does not comport well for spectroscopy when applied to a smaller size CTMFD) to develop RMs separately, for different sized CTMFDs ranging from what is relatively termed as larger (~16 cc) to smaller (~0.3/0.4 cc) SV CTMFDs. The smaller SV size allows for use in higher intensity neutron radiation and can also allow for detection of lower energy neutrons requiring higher Pneg states—without leading to saturation from dead time issues caused by stopping and starting the CTMFD each time an event occurs even though small in the range of few seconds. For lower energy epithermal neutrons (<50 keV) we used boron-doped DFP (explained below in the present disclosure) is beneficial to capture the impact on H*10 neutron dose. B-10 atoms (like Li-6) preferentially absorb neutrons at lower (<0.1 MeV) energy levels giving rise to monoenergetic Li-7 and He-4 recoil ions in the MeV range which can then lead to CDEs and hence, accounting for <0.1 MeV neutrons and their influence on H*10 neutron dose.

Methodology for Multi-Atom Spectroscopy (MAS) and RM Generation 50, 51: CDEs in TMFDs are caused by the introduction of sufficient energy into the sensing fluid from energetic recoil ions at and beyond threshold energy (ET), in combination with the tensioned metastable negative pressure (Pneg). Past SAS work provided guidance for the variation as representing a power law of the form given by Eq (3):

$$E_T = Ap^N \qquad (3)$$

where, $E_T$ is the neutron induced recoil energy threshold level needed for creating a cavitation detection event, p is the corresponding (negative) pressure of the fluid, and A & N are unknown constants which now can be determined from a combination of detailed nuclear particle transport calculations (atom by atom) and experimentation with a range of neutron sources. This is a complex MAS undertaking which must not only assess for elastic scattering alone (as was the case with SAS) but now also for the range of nuclear absorption-related reactions (esp. with F and B atoms) which can "create" huge spikes in the recoil energy level deposited within nm ranges and lead to CDEs. Furthermore, the cross-section (probability) of such interactions vary strongly with neutron energy and atom type, inclusive of producing sharp spikes. The resulting RM must incorporate these complex fluid attributes together with fluid metastability. This was done via coupling the well-established MCNP-PoliMi neutron transport code with a dedicated ion interaction code (SRIM), for which, a model of the laboratory's experimental area must be incorporated as well to account for neutron scattering from tables, floors, ceilings, etc. MCNP-PoliMi was used to simulate, and later extract, the individual spatial collision event locations inside the CTMFD's detection volumes, effectively removing the need to de-convolve the actual locations of the detection events measured in experimentation (note: the Pneg profile and hence, sensitivity to detection can change within the bulb itself as shown in FIGS. 2A and 2B 40). Other industry codes like GEANT may also be deployed. MCNP-PoliMi is advantageous over the more traditional MCNP code because of its deterministic treatment of particle interactions. Whereas a traditional MCNP type code simulation would randomly sample the double differential cross section to determine a neutron's energy after an elastic collision, an MCNP-PoliMi simulation accounts for discrete, analog momentum and energy conservation. Also of note is that PoliMi output is able to directly and conveniently list individual interactions with atoms in the detector (unlike with MCNP alone where "ptrac" files are needed and not as convenient) and when coupled with primary-secondary and tertiary ion interactions one can now convolute the multitude of aforementioned parameters for assessing for the individual CTMFDs of specific sizes/shapes for their actual response functions. In lieu of obtaining detailed data with monoenergetic neutrons, surrogate experimental data were acquired with hard and soft spectrum Am—Be and $^{252}$Cf isotope neutron sources which emit neutrons from thermal (eV) to 12+ MeV energies, positioned at multiple distances from the specific CTMFD; this allowed for acquisition of detection data over a range of neutron energies from two disparate spectrum neutron sources, while varying $P_{neg}$ from 1.5 bar to 10 bar. These data become de facto benchmarks for comparing against model simulations, and, consequently, creating the entries of the RM. Assessing and quantifying for the actual spatial energy deposition of the recoil ions resulting from individual interactions with neutrons of a range of energies, generated by MCNP, was accomplished using the well-recognized Stopping Range of Ions in Matter (SRIM) Monte-Carlo code. SRIM was chosen over other computational packages because of its rich treatment of the multi-physics aspects governing general ion energy deposition, including that from heavy ions. SRIM can (as claimed), calculate stopping powers with an average accuracy of about 5% overall, 6% for heavy ions, and better than 2% for high energy light ions and offers an optional library of experimental data supporting the accuracy of its calculations. In addition to stopping power and range calculations, the software, being a Monte-Carlo based package, has the capability to provide (output) to the user, the energy and position information for each ion transported in the simulation. The SRIM code package was coupled to the MCNP-PoliMi code to model the resultant energy deposition in the fluid generated by every neutron interaction generated recoil ion from MCNP-PoliMi.

Two models of energy deposition were developed using the SRIM code. The simplest of the two models used the commonly-used continuous slowing down approximation (CSDA) to generate the resultant average energy deposition in the fluid. Using the CSDA as the method of calculation for energy deposition has a few important implications for predicting the response of TMFDs. Mainly, the implications are a result of the deterministic nature of the CSDA which neglects statistical fluctuations in energy losses, such as are typical in stopping power regimes governed by (low ion energy) nuclear stopping. With the CSDA model, determination of whether a given recoil ion will induce a detection event is a "binary condition." The ion either deposits an amount of energy greater than the threshold energy value, resulting in a detection event, or the vapor cavity collapses back into the bulk fluid.

Figure 3:
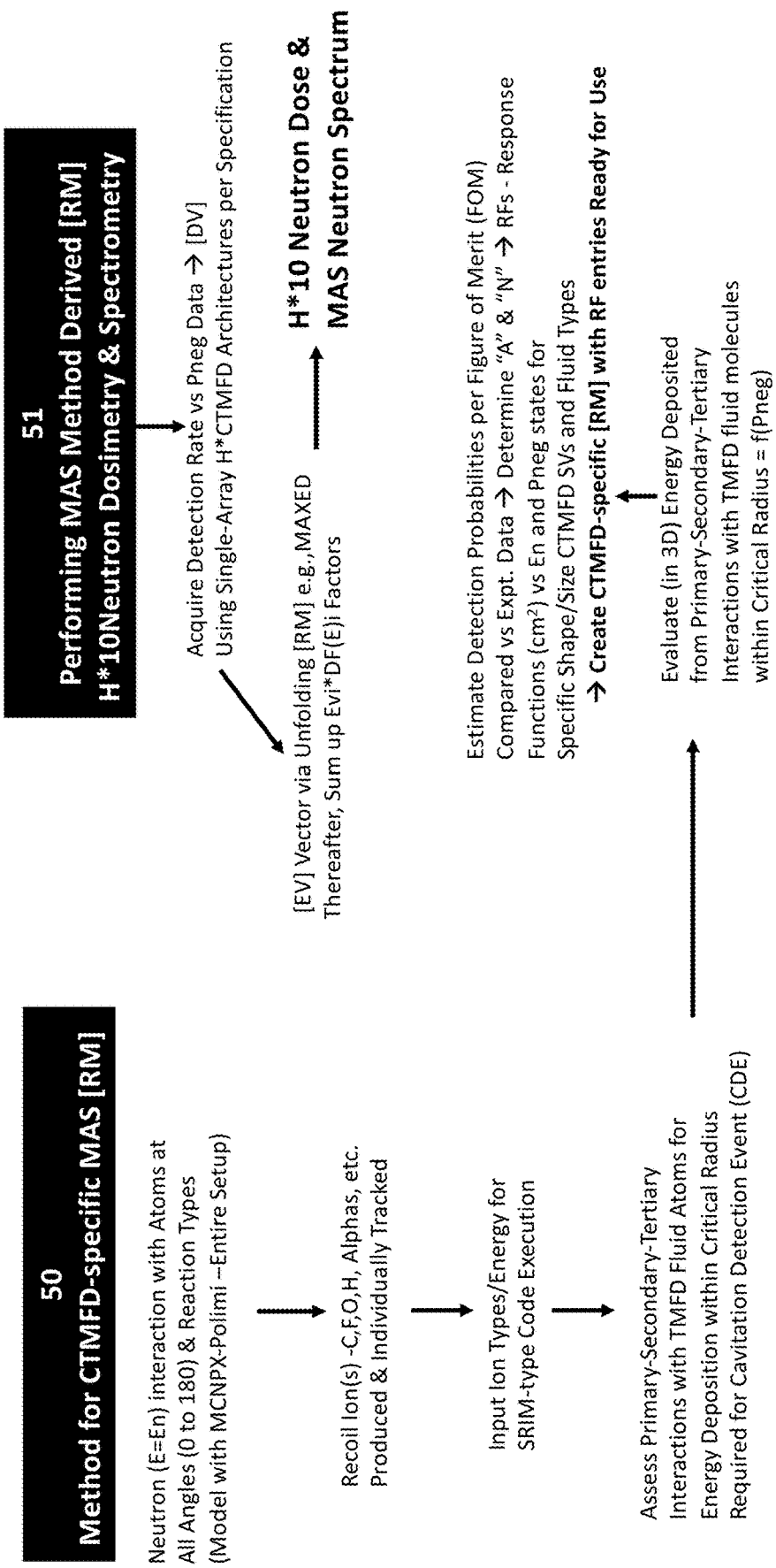
FIG. 3 illustrates how the response functions are developed for the response matrix [RM] matrix for any size CTMFD is developed and method for deriving H*10 neutron dose and neutron energy spectra.

The second model utilized "detailed calculations with full damage cascades" for all SRIM calculations. This enables tracking of secondary recoil ions generated by the primary ion (originating from the neutron interaction), as well as secondary ions which can then subsequently generate tertiary recoils. This is distinct from the CSDA model which only accounts for what the energy deposition inside a critically-sized vapor cavity has been in relation to the primary ion. In particular, utilizing the more complex full damage cascades treatment allows for the generated model to also account for the stochastic nature of energy deposition in the fluid by primary and other recoil ions leading to detection events as stepwise illustrated in graphical form in FIG. 3 50.

Utilizing the above, the necessary response functions needed for spectrum unfolding were generated by fitting the experimental data acquired with both Am—Be and $^{252}$Cf neutron sources (mentioned above), in combination with simulating the experiments with MCNP-PoliMi coupled with the full SRIM damage cascades (chosen over the CSDA model due to inaccuracies at high $P_{neg}$). A figure of merit (FOM) may be used such that the appropriate combination of "A" and "N" of Eq. (3) results in the least deviation of experimentally observed count rates compared with predicted count rates 50.

Three different sized CTMFDs were constructed and associated RMs for each were developed to demonstrate feasibility for covering a 100× range, in order to be able to perform neutron spectroscopy (for common Cf-252 and Pu—Be type spectra) from ultra-low 5-10 micRem/h fields to the multi Rem/h fields. While one may start at any large size detector for greatest possible absolute detection efficiency, a study was conducted such that results could be directly relevant for several common applications starting with 16 cc sensitive volume (SV) in cylindrical shape (height ~3.1 cm, radius ~1.3 cm). To reduce the absolute efficiency by 10× the next size was 1.6 cc (height ~3.1 cm, radius ~0.4 cm), and further 10× reduction would entail a 0.16 cc SV (height ~3 cm, radius ~0.12 cm) 10, 11, 12. However, practical issues arise as the radius gets smaller. Principal issues relate to proper entry of the TMFD sensing fluid into the central bulb cavity without entrapping air (which then may give rise to spurious false positive detection events and prevent one from covering the desired Pneg range. Another practical issue pertains to removal of the gas cavity via buoyancy once a CDE occurs. Smaller the inner radius of the bulb the greater is the difficulty with egressing the gas pocket through the system. From trial-error experimentation under room temperature conditions, it was found that when using DFP (and similar surface tension fluids), the lower end radius of the central bulb capillary volume should remain at/above ~0.4 cc (i.e., the central bulb radius should be maintained >~1 mm). If the detection volume must be lowered this is better accomplished now by reducing the height—for example, to avail of a 0.04 cc SV, the height of the central bulb can be reduced 13 from ~31 mm to about 3.1 mm which is only 2× the actual diameter of the bulb. In the limit, the bulb volume may be reduced further by 2× towards about 0.016 cc such that the CTMFD inner tube has no projected cylinder but is a continuous tubing. This then results in a 16/0.016=1,000× SV reduction and hence, potential enhancement of H*10 neutron dose range that can be covered.

As has been explained earlier, the development of RMs must remain specific to the individual SV CTMFDs due in part to 3D effects pertaining to both nuclear particle transport and interactions with the atoms of the sensing fluid, as well as for the complex 3D hydrodynamics and Pneg variations. The neutron interaction rate is dependent on the spectrum averaged macroscopic cross-section ($\Sigma$). Once is determined for any given spectrum (e.g., Cf-252 fission spectrum by first aggregating the energy weighted sum of microscopic cross-section for each of the constituent isotope (i) of the sensing fluid resulting in $\sigma_i$), after which $\Sigma$=N*Sum of #atom weighted $\sigma_i$, where, N is the number density of the sensor liquid. The interaction rate with the fluid in the SV can be determined directly from, I (#/s)=$\Phi$*$\Sigma$*SV, where, $\Phi$ (n/cm$^2$-s) is the neutron flux. $\Sigma$ must be determined for desired CTMFD sensing fluids such as DFP (the model fluid for this application) as well as for other similar candidate fluids such as perfluoropolyether (PFPE—$C_4F_{10}$O), perfluorooctane (PFO—$C_8F_{18}$), acetone ($C_3H_6$O), etc. The production of a CDE is dE/dx (LET) dependent. Since the LET for recoil protons from neutron interaction with H atoms is about 3-5× smaller, it requires larger Pneg states (typically above 8 bar in DFP at 20° C. to take advantage of detection from presence of H atoms in the sensing fluid). Higher Pneg attainment requires accounting for significantly higher rotational speeds, drive power and associated thermal management and mechanical stability issues. It is therefore, desirable to limit "H" atom content in the sensing fluid molecules. Table 2 below provides the $\Sigma 0$ values (for scattering) along with other useful data, without and with H atom contributions. It is noteworthy that since density varies with temperature, adjustments must be made accordingly. The boiling point and freezing points are also presented so that appropriate choices may be made for different operating conditions.

TABLE 2

$\Sigma$ values (for scattering) without and with H atom contributions

| Material | Density (g/cc) | N (#/cc) | $\Sigma$ (cm$^{-1}$) Excl. H atom | $\Sigma$ (cm$^{-1}$) Incl. H atom | Boiling Temp (° C.) | Freezing Temp. (° C.) |
|---|---|---|---|---|---|---|
| DFP ($C_5H_2F_{10}$) | 1.6 | 3.81 × 10$^{21}$ | 0.19 | 0.21 | 55 | −83 |
| PFO ($C_8F_{18}$) | 1.76 | 2.41 × 10$^{21}$ | 0.2 | 0.2 | 103 | −25 |
| PFPE ($C_4F_{10}O$) | 1.77 | 4.19 × 10$^{21}$ | 0.2 | 0.2 | 55 to 250 | −60 to −125 |
| Acetone ($C_3H_6O$) | 0.79 | 8.17 × 10$^{21}$ | 0.08 | 0.21 | 55 | −95 |

Note:Densities are at 20° C.; $\Sigma$ are based on fission spectrum neutron energy spectrum weighted for which the values of elastic scattering microscopic cross-section are obtainable from online sources such as JENDL databases; σ (barns) = 2.37 (C-12); =2.6 (B-10); =3.61 (F-19); =2.76 (O-16); =3.93 (H-1). For F-19 other interaction mechanisms can also occur such as charge particle interactions that aid in detection enhancement via interactions - these are included in the MCNP-Polimi-SRIM simulations. Unlike for charge particle reactions like (n, α) for which a single energy ions are produced, elastic neutron scattering can produce ions of energy ranging from En * {1 − [(A − 1)/(A + 1)]$^2$} for a head-on collision, down to zero/negligible for a grazing angle scatter.

The larger is the radial diameter of the SV, the greater is the Pneg field variation as well. The higher the Pneg, the lower the energy of neutrons that can be detected. The Pneg values quoted herein, are at the centerline (r=0) and as shown in FIGS. 2A and 2B the Pneg can vary substantially with "r", the detection efficiency for various sized SVs of variable inner diameters for the SV bulb, will also vary radially with neutron energy (inclusive of recoil ions being produced in a vast range of energies from multiple types of atoms and interaction types in MAS spectroscopy), and, together with hydrodynamic effects must be systematically calibrated experimentally for design a suitable apparatus configuration. This is done by calibrating the individual SV CTMFDs against a known NIST-certified neutron source—examples of data from experiments 41 using a Cf-252 source in the table for three SV (16 cc, 1.6 cc and 0.4 cc) CTMFDs using DFP at 20° C. Intrinsic detection efficiency (ε)=C/I, where C=CTMFD count rate, and I=Φ*Σ*SV. As is not obvious, c may not linearly scale with SV size and all across Pneg states. Strong non-linearities are noted in FIG. 2B and included in the respective [RM] presented in FIG. 4. Detection efficiency variation with Pneg plots are presented in FIG. 2B for CTMFDs using DFP as detection fluid; similar variational trends and values vs Pneg are obtained for DFP, PFPE and PFO, but not for acetone (due primarily to the lack of contribution of the H atoms to detection unless the Pneg state exceeds ~8-10 bar at 20° C.

TABLE 3

Efficiency ratios between various sized CTMFD SVs

| Pneg (bar) | ε (16)/ε (1.6) | ε (16)/ε (0.4) | ε (1.6)/ε (0.4) |
|---|---|---|---|
| 3 | 3.4 | 28.1 | 3.4 |
| 5 | 6.3 | 49.2 | 6.3 |
| 9 | 3.8 | 33.4 | 3.8 |

As noted from Table 3 above, the efficiency ratios between various sized CTMFD SVs do not scale directly with the as constructed central bulb size of FIG. 1. For example, a 10× larger 16 cc SV does not offer consistent 10× larger efficiency over the 3-9 bar Pneg range compared with a 1.6 cc SV. This is due in part to the sharp variations of Pneg within the SV itself as mentioned earlier via FIG. 2A. The SV ratio relationship improves between 16 cc SV and 0.4 cc SV (approximating ~40× ratio) as well between the 1.6 cc and 0.4 cc SV CTMFDs where the ratio is about 4λ. These are significant findings which make it essential to calibrate each size SV CTMFD with Pneg for producing a robust and valid RM.

The relative sizing of SVs also enables one to utilize the larger SV for lower Pneg states which enable efficient monitoring of higher energy neutrons and vice-versa. Such a scheme may then be used with simultaneously operating CTMFDs of various sizes that cover the range of Pneg states in segmented fashion, even though any one of them can in principle be used as well to cover the entire fast neutron energy spectrum if the neutron radiation intensity is not high enough to lead to saturation (i.e., detection taking place before the appropriate Pneg state can be reached while spinning up in speed).

Figures 4A, 4B, 4C:
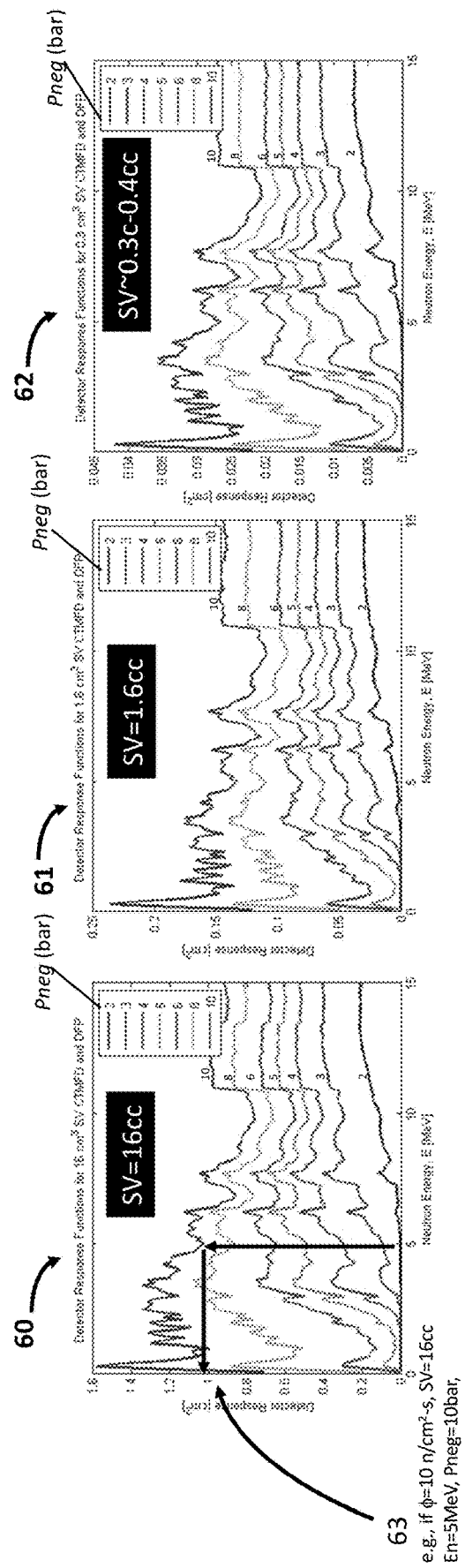
FIG. 4A shows detector response function values vs neutron energy for Pneg states from 2 bar to 10 bar for 16 cc CTMFDs for [RM] formulation utilizing DFP as the sensing fluid for fast neutron energies.
FIG. 4B shows detector response function values vs neutron energy for Pneg states from 2 bar to 10 bar for 1.6 cc CTMFDs for [RM] formulation utilizing DFP as the sensing fluid for fast neutron energies.
FIG. 4C shows response detector function values vs neutron energy for Pneg states from 2 bar to 10 bar for 0.3-0.4 cc CTMFDs for [RM] formulation utilizing DFP as the sensing fluid for fast neutron energies.

The (deemed optimal) neutron response matrices from response functions 60, 61, 62 shown in FIGS. 4A, 4B, and 4C were developed for CTMFDs for individual varying sensitive volumes (SVs) comprising: 0.4 cm$^3$ SV, 1.6 cm$^3$ SV, and 16 cm$^3$ SV CTMFD volumes, respectively as shown in FIG. 4 (only select $P_{neg}$ shown color coded ranging from 2 bar to 10 bar, for clarity; in actuality, the energy binning spans ~150 energy bins). The sharp changes in the response functions with neutron energy are associated largely with F-19 resonances. The corresponding optimal FOM "A" and "N" combinations with this approach (FIG. 3) are: 720/−1.82 (16 cc), 660/−1.82 (1.6 cc), and 710/−1.74 (0.4 cc). As mentioned earlier, for simultaneously enabling low-to-high rate H*10 neutron dosimetry, multiple SV configurations may be deployed simultaneously. The lower the SV, the higher the neutron (dose) intensity field that can be accommodated without saturation, and so on. FIG. 4 also clarifies 63 how the detector response function relates to neutron flux and Pneg state for any given SV—shown for 16 cc SV, for which, if the incident 5 MeV neutron fluence is 10 n/cm²-s and the Pneg=10 bar, the 16 cc CTMFD would detect at the rate of 10 cps. On the other hand, if the SV=0.4 cc, the detection rate would be ~0.2 cps.

For the dose rate in the 5-50 µRem/h fields for typical continuous neutron spectra from isotopic ($\alpha$, n) as well as for fission spectrum sources, the 16 cc SV can provide well-characterized spectra without substantial dead-time issues even when operating between 1-10 bar Pneg states. The computed H*10 neutron dose is within 5% of the value obtained using MCNP model-based predictions even with a flat guess assumption. This is shown later as Example 1.

Spectrum unfolding requires in principle inversion of a large (non-square) matrix and typically requires use of iterative based unfolding codes like MAXED. The solution space in theory (i.e., the optimal solution from unfolding) can be non-unique and virtually infinite and in some cases non-convergence may result. An initial "guess" spectrum must first be suggested to start the iterative unfolding process. The closer is the guess spectrum to the actual spectrum, the faster and more accurate the final unfolded spectrum. Without prior knowledge of the actual spectrum a safe profile to choose is a "flat" spectrum. For the [RM] associated with FIGS. 4a-4c, under these conditions, the RM for the 16 cc SV in conjunction with MAXED unfolding code gives rise to good results (as shown later in examples) for the entire energy range of interest and Pneg states varying between 1 to 12 bar, even with a flat "guess" spectrum and also for ultra-low neutron radiation fields under 10 micRem/h as shown as Example 1. For ~100+ micRem/h neutron radiation fields wherein the 16 cc SV CTMFD may get saturated (when the detection rate >>20-50 cpm) when operating at Pneg states greater than ~4 bar a segmented approach provides a viable solution as follows. Use the 1.6 cc RM, this required use of the derived RM in the Pneg range 4-7 bar; and, for the 0.4 cc RM, this requires Pneg range 8-10+ bar. The unfolded differential spectra can then simply be linearly "stitched" together for obtaining the overall dose for neutron energies 0.1 MeV to 12 MeV. This validity of this solution was realized from trial-error. Furthermore, as shown later in the present disclosure, with the addition of B-10 to a CTMFD and operating it at a single Pneg=5 bar state, the H*10 neutron dose for all epithermal neutrons <0.1 MeV can also be accounted for and included as well as shown in Example 2. Therefore, for high intensity fields wherein the 16 cc CTMFD cannot be driven to higher (>4 bar) Pneg states (due to relatively instant detection and the detector's higher net efficiency), the aggregate configuration of the 3 SV CTMFDs (non-borated) operating in parallel can offer the ability to get to the desired 0.1-12 MeV spectrum dose by operating them individually for Pneg between 1-4 bar with the 16 cc CTMFD, between 4-7 bar with the 1.6 cc CTMFD, and between 7-10+ bar with the 0.4 cc CTMFD. Since detection efficiency is related to number of possible interactions for a given neutron flux, the ratio of 16 to 0.4 provides for a potentially ~40× increase in neutron intensity for the 0.4 cc CTMFD compared with that for the 16 cc CTMFD and so on. For example, if the 16 cc CTMFD allows one to perform spectroscopy for up to 0.1 mRem/h fields, the aggregate with the 0.4 cc CTMFD could now extend the range towards ~5 mRem/h fields. For many daily situations wherein, the allowable dose rate is limited to be well under 1 mRem/h (Note: At 2 mRem/h a person working 2,000 h/y could receive 2,000 mRem/y; most U.S. institutions strive to limit excess radiation dose to well under 200 mRem/y or <0.1 mRem/h for most staff and 10× lower for pregnant women towards 20 mRem/y or <0.01 mRem/h). For nuclear workers the USNRC restricts the maximum annual whole-body dose to remain <5 Rem/y. Therefore, the H*10 TMFD system as devised and described could readily satisfy the lower-to-upper requirements and, in addition, also for ultra-low radiation fields in the 10 micRem/h range—for which state of art detectors become per experience (see Example 1) largely dysfunctional (common survey meters like the "Snoopy™" from Ludlum, Inc., Fuji-NSN3™, as well as other similar units offer metering enablement only for >100 micRem/h neutron intensities).

Once the MAS-based RM is established for any CTMFD of any size SV, it can then be utilized for performing spectroscopy enabled H*10 neutron dosimetry for any arbitrary neutron energy field. If or once the neutron energy spectrum is reasonably established for a certain area but the intensity variations are variable, the H*10 TMFD system can be operated for dosimetry in high-to-low intensity neutron radiation fields in a non-spectroscopic mode by acquiring detection rate data at a single, suitably adjusted optimal Pneg state. As noted in FIGS. 2A and 2B the detection efficiency for the same spectrum neutron source is virtually exponential with Pneg—varying by a factor of ~100,000× from just under 2 bar to ~11+ bar. Therefore, in non-spectroscopic mode of operations (e.g., when the neutron spectrum field in a given location is already well established), it becomes feasible to deploy the H*TMFD system for that spectrum along with its already pre-determined RM, for deriving the H*(10) dose while operating the CTMFD sensor at a single optimal $P_{neg}$ for deriving rapid-fire (<1 min.) estimates of dose rate (demonstrated by an Example 3 later on).

Once the [RM] is developed it is not obvious as to how many Pneg states are required for acceptable spectroscopy-based dosimetry. That is, how fine should be the increment of Pneg during the sweep in order to obtain good accuracy for the spectrum-based H*10 neutron dose. It is found that neutron spectroscopy using the as-derived optimal response matrices for individual SV TMFDs is accomplished by recording detection rates at only a few $P_{neg}$ states (~3-5 are found to be sufficient) and unfolding into 152 energy groups, from 0.1 MeV to 15.2 MeV (Note: as is explained later, neutron detection below 0.1 MeV down towards thermal energy neutron energies is also possible with borated configurations). An example (see Example 1) follows wherein the accuracy of the H*10 neutron dose is validated against a theoretical standard—in which it is shown that even obtaining detection rates at 3 Pneg states is sufficient to obtain ~1% accuracy. This permits significant reduction in time.

Extending and calibrating the CTMFD for H*10-dose estimation for neutron energies below 0.1 MeV using borated TMFDs. The [RM] entries of FIGS. 4A, 4B, and 4C were possible to develop for Pneg states through about 12 bar which allowed even ~0.1 MeV neutrons from a Cf-252 fission spectrum source to be detected accurately. If the Pneg state can be increased further beyond 12 bar, the lower neutron energy limit may be commensurately reduced. From practical considerations, higher Pneg states will involve higher rotational speeds and attention to mechanical stability and thermal management; fortunately, the weight factor ($w_r$) dependence of H*10 neutron dose per unit neutron fluence (for neutrons of energy <0.1 MeV for a typical fission spectrum) is found to have a <5% influence on the overall computed H*10 neutron dose. Hence, for enablement of accounting for dose for <0.1 MeV neutron energies, the neutron interaction with atoms in the sensing fluid needs energy amplification. A judicious inclusion of natural boron (B) of which the B-10 content is ~10% into the TMFD sensing fluid DFP (or other such fluid) was found from trial-error to offer a reasonable solution (of-course, using enriched B (with B-10 alone) could then reduce the doping need by 10× compared with the current example). Unlike fast (>0.1 MeV) neutrons, thermal (~0.02 eV) neutrons cannot by themselves deliver the needed energy via elastic scattering to lead to CDEs in TMFD fluids. However, upon thermal neutron absorption in B-10 an energy amplification of ~$10^8$ (hundred million) results from the exothermic $^{10}B(n,\alpha)^7Li$ exothermic reaction which releases ~2.3 MeV of energy over sub-micron track lengths—which now provides sufficient LET deposition at modest Pneg states, e.g., ~4 bar, to lead to CDE to detect this interaction. Whereas, the neutron interaction probabilities with B-10 are ~$10^3$b at ~0.02 eV (dropping exponentially towards ~2b for 0.1 MeV), the elastic scattering cross-section is uniformly lower in the ~1-3b range over 0.01 eV through 10+ MeV. Including B-10 preferentially allows for amplified detection rate for epithermal (<0.1 MeV) neutrons with only modest (100× lower w/o in sensing fluid) inclusion of B-10. The as-formulated and successfully vetted borated mixture (is herein referred to as DFP/B) comprises a tertiary azeotrope mixture comprising DFP, tri-methyl borate (TMB) and methanol (M) in the following approximate proportions: DFP (~80 w/o); TMB (~16 w/o) and M (~4 w/o). The ~4 w/o methanol (M) component helps to dissolve precipitates from TMB decomposition and helps to avoid false positives from spurious nucleation.

Figure 5:
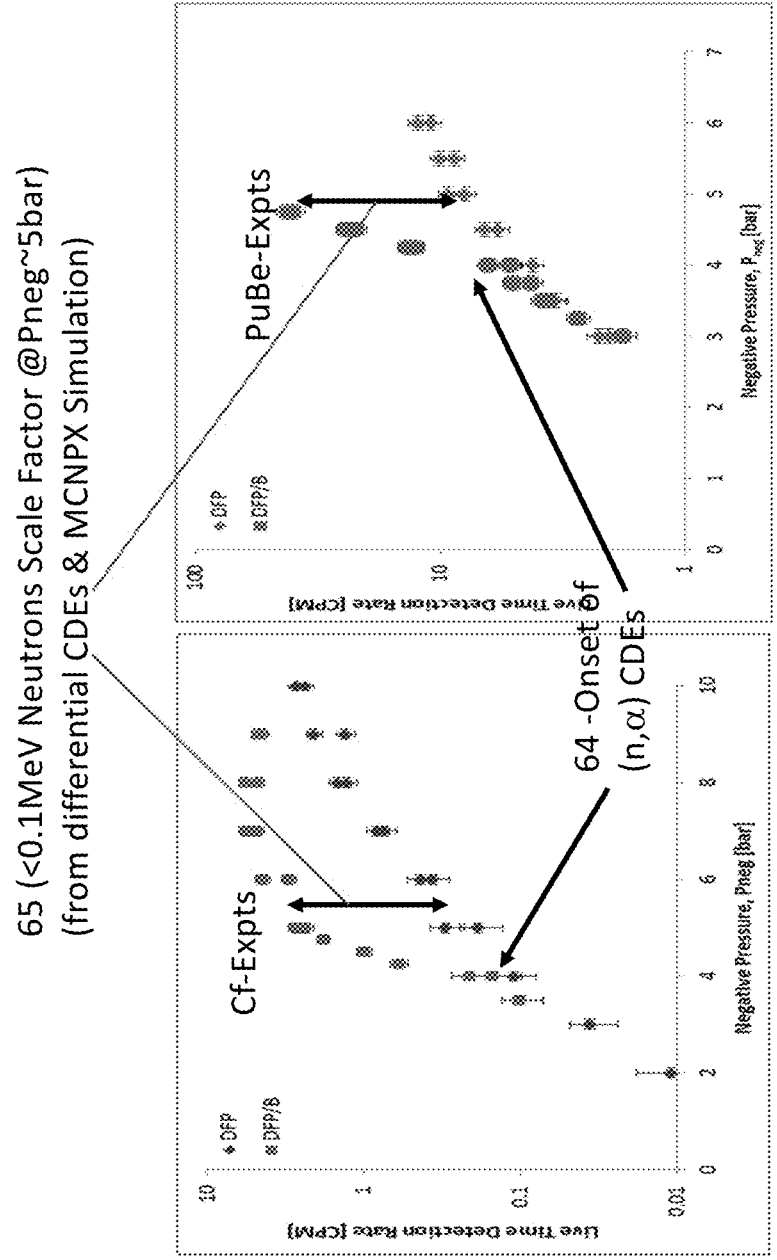
FIG. 5 shows experimental data on detection rate vs Pneg with Cf and Pu—Be neutron sources, and to show methodology for scale factor determination to derive epithermal neutron H*10 dosimetry.

Lower energy (<0.1 MeV) neutron sensitivity must be characterized methodically to derive scaling factors for dose determination. This may be accomplished via MCNP code simulations of the neutron source-H*TMFD system coupled with experiments to decipher for the under 0.1 MeV neutron energy spectrum influence. Two experiments were conducted first with a Cf-252 ($3\times10^4$ n/s) source which could be placed within the cavity of a 5" OD polyethylene sphere at a distance of ~100 cm from a 1.6 cc SV CTMFD; secondly, with a much stronger Pu—Be ($2.3\times10^6$ n/s) source placed within a 2" OD, 0.04" thick aluminum tube placed within an available 11" diameter, 13" tall paraffin wax bucket placed at a distance of 200 cm. Both experiment setups were modeled using the MCNP6 code for modeling neutron transport, fluxes and spectra and interactions with the 1.6 cc H*TMFD sensor fluid to estimate for the ICRP H*10 dose derived for interactions with neutrons <0.1 MeV. FIG. 5 shows how the live detection rates vary for the two (Cf-left; PuBe-right) sources with and without the B addition. In both instances one sees a stark rate increase in detection rates at and above Pneg ~4 bar (the relative inflexion tension state, for neutron energies below ~0.1 MeV) wherein the strong B-10 absorption induced energy amplification induced CDE starts to contribute in a dominant fashion 64. Different B-10 loading can thus vary the shape of the resultant data plots. The subtraction of detection rates between with and without B in the TMFD sensing fluid offers the ability for calibration for the <0.1 MeV neutrons but must be performed above the threshold Pneg ~4 bar that corresponds to onset of the (n, it) reaction. This excess live time detection rate was calculated at Pneg of 5 bar (i.e., sufficiently above the 4 bar threshold) 65. The resulting calibration factor for the two disparate (intensity and spectrum) neutron source experiments is close to that for each—amounting to ~0.214 micRem/h per CPM (for Cf-252) and ~0.219 micRem/h per CPM (for Pu—Be), respectively when used with borated-nonborated DFP in 1.6 cc SV CTMFDs. In much higher intensity epithermal energy fields when even the 0.04 cc SV borated DFP CTMFD may get saturated, a neutron absorber (e.g., borated) sleeve shield around the SV bulb should be used and the scale factor determined similarly. The scale factor will be necessarily different for different sized CTMFDs due to their different detection rates commensurate with their specific sensitive volumes. The sharp increase in detection rates with both Cf and Pu—Be spectrum sources presents non-obvious evidence that the excess detection events are mainly from (n, α) reactions with B-10 at/below ~0.1 MeV and not dependent on the relative intensity nor the spectral differences of neutrons emanating from the two radically different types of sources. Note that Cf-252 is a "soft" spontaneous fission spectrum neutron source, whereas, the Pu—Be is a relatively "hard" (α, n) spectrum neutron source. Other isotopes similar to B-10 (e.g., Li-6, Gd isotopes which enable charge particle production and energy amplification into the MeV range) may also be utilized in similar fashion: first to produce a mixture that contains quantities of the select isotopes which are commensurate with their absorption probabilities and then to include chemical additive like methanol for dissolving precipitates to overcome spurious.

For performing fast or epithermal region dosimetry single individual (non-doped and doped) may be used separately as shown schematically in FIGS. 6A and 6B. As shown in FIGS. 6C, 6D, and 6E, to simultaneously perform spectroscopy over the entire thermal to fast range with CTMFDs as described herein requires one to construct an array with at least 2 CTMFDs not necessarily of the same SV, 70 (FIG. 6C), 90 (FIG. 6D). Shown are individual CTMFDs with their own acrylic safety enclosures—in case the individual enclosures are removed, the units may then be placed within a common safety enclosure (e.g., ~2 mm thick acrylic) 73 and positioned side by side (side-ways 71 or one above one another 72) on a rotating platform 80—one containing the isotope like B-10 72, the other without 71 such an isotope which enables CDEs via neutron scattering. The 2 CTMFD configuration 70 (FIG. 6C), 90 (FIG. 6D) would suffice if one, e.g., the 16 cc CTMFD were used for under 100 micRem/h fields. However, for above ~100 micRem/h continuous spectrum neutron fields may lead to saturation of the 16 cc CTMFD for Pneg states above 4-6 bar. In order to enable going to the multi-mRem/h and above neutron intensity radiation fields, using the method and apparatus types for which RM unfolding (with MAXED) can be accomplished using an array 100 comprising 4 CTMFDs as shown in FIG. 6E. In this configuration, 3 CTMFDs are nonborated (i.e., DFP alone) one of each size 16 cc, 1.6 cc and 0.4 cc respectively, for which Example 2 results are presented. The fourth CTMFD is borated 1.6 cc for this example. The borated CTMFD size should be chosen to avoid saturation (e.g., to remain about <20-30 cpm when using IR beam based CDE recording; other faster means for monitoring such as via acoustic shock monitoring could enable higher cpm). The 1.6 cc borated and nonborated CTMFDs are placed side by side 101, 102 to permit close to the same neutron flux environment to both. The 4 CTMFDs are shown stacked side-by-side e.g., on a rack that may be rotated 80, 81. Rotation is useful when in a completely unknown radiation field in which the location of source or sources is unknown—this permits each of the CTMFDs to scan the 3D space. Speed of rotation in the 1 RPM range (for steady state fluxes) is deemed sufficient since the time for spectroscopy data gathering is usually in the several min. to hour range even for extreme low radiation fields in the 5-10 micRem/h range. Rotation in the lateral direction or vertical direction may be deployed by use of a motor-driven assembly. Rotation in the lateral direction may proceed continuously in time. Rotation in the non-lateral plane requires one to ensure that the CTMFD has itself started to spin and the Pneg state is preferentially above the gravity pressure head; in essence, such that the 1 g force field is overcome and gas ingress into the central SV bulb region is avoided. For example, at sea level, for liquid (DFP) density of ~1600 kg/m$^3$, for the liquid height (from bottom of SV towards the upper arms) of about 0.1 m implies a gravity pressure head of ~$10^3$ Pa (=$10^3 \times$ 9.8×0.1) which is only ~0.01 bar. For a typical meniscus separation of ~0.1 m, fluid density of ~1,600 kg/m$^3$, the required rotational speed to avoid gas ingress can be derived from the Bernoulli law (i.e., using Eqn. 1 without the Pamb term) as only ~2 Hz. Note: under such conditions, for example, to reach Pneg state of 4 bar (i.e., 4 bar below ambient 1 bar) would require a spin rate of about 40 Hz. It is then possible to consider operating the CTMFDs such that the spin rate is always maintained to be just under ~2 Hz such that gas cavity egress can occur while substantially removing the possibility of air ingress due to non-vertical operation from that shown in FIG. 1 and FIGS. 6A, 6B, 6C, 6D, and 6E.

Methods for configuring and preparing CTMFDs for operation without degassing. Although any sufficiently robust, sensing fluid compatible enclosure material may be used, the CTMFD units successfully used for H*10 neutron spectrometry-dosimetry used annealed borosilicate glass tubing with wall thickness of ~2 mm (lesser thickness can lead to cracking from shocks generated during CDEs and from repeated stress). Use of glass (either borosilicate or quartz) enables overcoming of attack by TMFD fluids like DFP, acetone, etc. To improve mechanical stability the height of the diamond shaped apparatus must be minimized but producing such shaped tubing as in FIG. 1 requires accurate glass blowing for stability and CDE gas-vapor egress due to which a 30 degree angle 6 between the arms was found to be the minimum optimal angle for construction. This design approach has permitted 2,000+ h of operation without failure. Being transparent, glass allows for an IR beam to be used along with a receptor to detect onset of CDEs within ms. IR beams can get affected from common outside ambient light sources due to which (as well as for safety) an acrylic container (~0.3 cm thick) 73 is beneficially used to envelope at least the diamond shaped glass structure region. Embodiments in FIGS. 6C and 6D show the entire CTMFD (including the drive motor) encased by a safety enclosure as well. Acrylic attenuates IR-beam interfering commonly occurring room light photons. Temperature sensors monitor the inlet-outlet air temperature as well as the SV surface temperature to permit dynamic temperature compensation. For neutron detection efficiency determination, one must account for scattering-absorption effects in acrylic as well as the glass (or other CTMFD material) materials. This is readily accomplished via MCNP code modeling and simulations.

CTMFDs once filled with sensing fluid (e.g., DFP) will contain varying quantities of dirt particles (motes) and dissolved gases (mainly air) which can give rise to spurious cavitation under Pneg conditions—the greater the Pneg the higher the propensity for dissolved gas and trapped motes in solution to cause cavitation. As a neutron detector, one must ensure that the cavitation detection event (CDE) has occurred due to a radiation (e.g., neutron/alpha) interaction and not from non-radiation interactions. Through experimentation it has been determined that pre-filtration through commonly-available 0.2 micron PTFE filters attached to a common syringe needle will (in degassed state) permit one to avoid spurious CDEs due to dirt (mote) particles for Pneg states up to 25 bar. Alternately, one should resort to using high purity American Chemical Society (ACS) (>99.5% purity grade) fluids. For ensuring "sufficient" removal of dissolved gases several methods were evaluated as follows: (i) Once filtered DFP is added to the diamond shaped apparatus of FIG. 1 the CTMFD is progressively allowed at increasingly elevated Pneg states to cause CDEs in the presence of a typical ($\alpha$, n) or Cf-252 type isotope neutron source or a pulsed laser beam. The use of an external neutron source or laser allows for controlled and rapid CDEs. If one relies on cosmic neutron background, at sea level the average time between CDEs for a 15 cc SV may be expected to be ~100 s on average (and commensurately greater for smaller SVs). As dissolved gas emanates each time the apparatus is stopped and the gas cavity allowed to egress each time before re-start. In an unsealed/non-degassed CTMFD, after about 50-60 CDEs in succession, for H*10 dosimetry the degassed state is usually sufficient—however, to check for sufficiency for H*10 spectrometry, the CTMFD must be tensioned towards Pneg=12 bar without spurious CDE in the absence of intentional external stimuli like neutrons or other particle beams; (ii) Same as for (i) after DFP type sensing fluid is entered, the apparatus can be made to remain insensitive to spurious CDEs by subjecting the diamond shaped tubing of FIG. 1 to precompression from inside and out per the teachings of U.S. Pat. No. 10,233,843 B2 (Mar. 19, 2019) Taleyarkhan; (iii) Same as for (i) but before or after sensing fluid is entered into the CTMFD, if available, the sensing fluid can be rapidly (within minutes) degassed via acoustic perturbations under vacuum (e.g., by placing the bulb in an ordinary jewelry cleaner bath or in a cup horn, while pulling a substantial vacuum (e.g., ~10-25 mm Hg) on the diamond shaped tubing through the top stem)—once completed, the CTMFD Pneg state should be possible to elevate through 10-12 bar without spurious CDEs commensurate with background. Once the degassing is accomplished by use of any one or in combination of the three methods, top stem 20 should be capped with a stopper 21 of suitably compatible bearing a thin (~0.5 mm OD) needle 22, sealed to the material (e.g., glass) of the CTMFDs top stem tube (FIG. 1) with an appropriate sealant material that is not attacked by, i.e., is compatible with the sensing fluid (e.g., ethylene propylene diene monomer "EPDM" sealant allows for sealing DFP CTMFDs for over 12 months without leakage). CDEs can lead to shock waves and energetic bursts that may lead to the top cap to become loose and hence, for the CTMFD to become unsealed and thereafter, prone to spurious CDEs. It is preferable, therefore, that the stopper may be compressed/affixed in place mechanically from the top when attached to the drive shaft or upper support structure. Once the stopper (e.g., rubber) is affixed, the thin (~0.5 mm OD) needle allows for evacuating the air cavity with a vacuum pump 23 (operating at ~19 mm Hg) above the liquid and then pulled out after which the rubber seals itself. Once this is accomplished, the CTMFD is readied for operation at any subsequent time a reading is required for neutron detection without having to undertake to degas each time for 50-100 CDEs and reject these first spurious events.

An extra measure for avoiding spurious CDEs is to ensure absence of significant moisture ingress into the sensing fluid.

It has been found that for DFP, water content of up to the solubility limit of ~0.3 v/o (under STP) does not impact neutron detection efficiency, nor lead to spurious CDEs. However, when in excess of this limit, insoluble water content even if dispersed within the DFP can lead to significant spurious cavitation onset to variable levels and must be avoided. Fortunately, the 0.3 v/o (e.g., ~80 mg water in 25 cc DFP) level is significantly (30-40×) greater than the moisture content even in ~95% RH conditions in air under STP conditions.

Method for including dynamic temperature compensation for baseline related detection efficiency and control. Since TMFDs use fluids for detection of neutrons, alpha, etc. via bubble nucleation, the Pneg state required for detection of various energy particles must account for fluid temperature. Temperature changes change the density as well as the threshold Pneg required for detection. Density changes vs temperature are readily calibrated for by placing known quantity of sensing fluid in a constant temperature bath and noting volume changes and the meniscus variations as well. For a typical ~15-16 cc DFP CTMFD as noted in FIG. 1 the inner/outer meniscus radius ($r_i$) separation distance vs temperature T(° C.) is obtained from: $r_i$ (mm)=−1.483*T+140.5; $r_o$=−1.5*T+171.9. Once this is known, the change in "r" 2 the average (between lower and upper points of the liquid due to surface tension) meniscus separation distance which enters the Pneg determination via Eq. (1) is established such that, by dynamically monitoring the SV fluid temperature with a non-contact optical beam sensor one can dynamically alter the rotation speed to maintain the desired Pneg. The ability to account for detection efficiency change with temperature requires obtaining detection rate data vs Pneg (using an external neutron source e.g., Cf-252, at various SV temperatures and developing a correlation for shift in Pneg threshold vs temperature. Once accomplished, the detection efficiency at any temperature other than at the base ~20° C. (STP) temperature can be then accommodated and tied to performance at 20° C. for which the RMs were developed. This method was used with DFP CTMFDs for the temperature range varying from 0° C. towards 50° C. As the fluid temperature increases, the Pneg state required for detecting neutrons of a given energy decreases. For example, when testing with a Cf-252 source of an arbitrary intensity at Pneg of 2.5 bar results in a CDE detection rate at 20° C., to get the same CDE rate at temperature (T in ° C.) of 40° C. and 0° C. states will require commensurate Pneg states of ~1.25 bar and ~3.8 bar, respectively. A correlation fit: Pneg (bar)= −0.0703*T+4.04 captures the variation of Pneg vs SV fluid temperature. Therefore, as the ambient temperature changes somewhat (e.g., due to room air-conditioning) when conducting H*10-spectrometry data gathering, the speed of rotation is changed dynamically to change the Pneg to the equivalent level commensurate with 20° C. operation.

The examples provided below are meant to illustrate the principles of the present disclosure, and are not intended to limit the applicability of the principles in the present disclosure. The below examples (as well as neutron efficiency and RM data for various sized CTMFDs presented earlier) were obtained using 2 mm thick borosilicate glass tubing-built, filtered-degassed-sealed temperature compensated CTMFDs per the aforementioned specification.

Figure 7B:
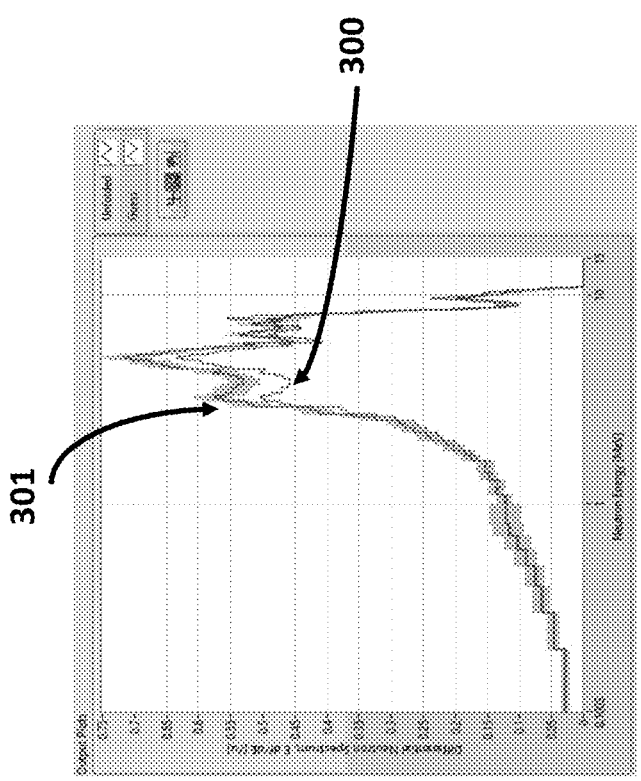
FIG. 7B shows sample results of thermal-to-fast neutron spectroscopy with a 4-CTMFD array in the 200-300 micRem/h field.
Figure 7A:
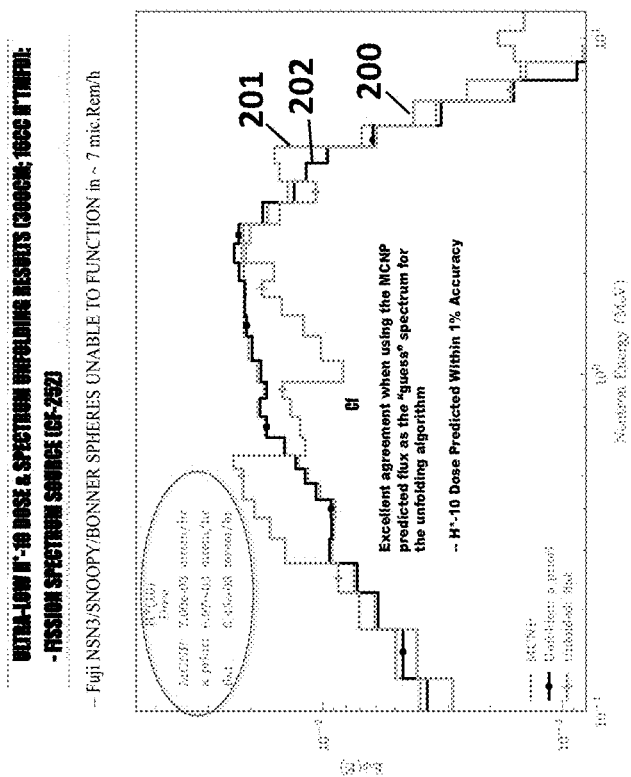
FIG. 7A shows sample results of H*10 fast neutron spectroscopy and dosimetry with a 16 cc CTMFD at ultra-low (7 micRem/h) neutron radiation fields and comparison against MCNP theoretical predictions.

Example 1: For long-term (e.g., 2,000 h/y) occupancy spaces the allowable total annual dose (above natural background) varies with the institution but often targeted to remain under 20 mRem/y, which translates to a dose rate field environment of ~10 micRem/h (0.01 mRem/h). Conventional survey device dials offer metering functionality starting at 0.1 mRem/h and even BSS and other devices like Fuji-NSN3 are hence, essentially dysfunctional. In an experiment using a Cf-252 neutron source experiment wherein for the specific source-to-CTMFD distance utilized the MCNP6 code prediction was ~7 micRem/h. Using a single 16 cc CTMFD with the RM developed as taught in this application, the results 200, 201, 202 are as shown in FIG. 7A for two different initial guess spectra. Noteworthy is that the H*10 TMFD neutron dose estimates from spectra were obtained at only 3 Pneg states uniformly between 1 bar to 10 bar (i.e., at Pneg (bar)=4, 6, 9 respectively). This covered the entire fast (0.1-12 MeV) energy range. The spectrum weighted H*10 dose from MCNP is 7 micRem/h. With an initial guess spectrum for that of Cf-252, the H*-CTMFD predicts ~6.97 micRem/h dose rate and the predicted spectrum matches nearly 1:1 with that of the MCNP "gold" standard. With a flat guess spectrum, the predicted spectrum (even with data obtained at only 3 Pneg states) reasonably captures the overall fission spectrum and the weighted dose rate is now ~6.45 micRem/h (~8% deviation from MCNP). These predictions were based on acquiring 250 detection events at each Pneg state. The error increases with reduced number of detection events (DEs), and varies non-linearly: ~14% (25 DEs); 9.7%(50 DEs); 6.7% (100 DEs). As an example, at an average detection rate of about 5 cpm, the acquisition of sufficient data to remain within +/−14% of the actual dose could be as low as ~15 min. (0.25 h)=25 CDEs/Pneg divided by 5 cpm times 3 Pneg states. From experience, conventional (e.g., BSS type neutron spectrometers) are dysfunctional in such low dose rate fields, and often require 1+ week (i.e., ~400× longer to decipher the spectrum weighted dose with ~15% accuracy in tens of micRem/h neutron dose rate fields).

Example 2: H*10 dosimetry in ~250 micRem/h fields using an array of four CTMFDs covering the entire thermal to fast energy (0.02 eV-12 MeV) energy range. Per the configuration of FIG. 6E 100, three non-borated DFP CTMFDs with SVs=0.4 cc, 1.6 cc and 16 cc were used for fast (0.1-12 MeV) fast neutron spectroscopy and a single borated 1.6 cc CTMFD was operated at Pneg=5 bar to determine the dose for epithermal (<0.1 MeV) neutrons. FIG. 7B shows the resulting spectrum 301 including the uncertainty band. The guess spectrum for a pure source (without 3D effects) is also shown 300. A Cf-252 source emitting ~2.33×10$^5$ n/s was placed ~123 cm away behind a 1″ Pb shield from the centerline of the 4-CTMFD array. The H*10 neutron dose predicted by the H*TMFD architecture after gathering data over 6 h, and from a Ludlum 42-S BSS system operated over 26 h are found to be 245+/−25 micRem/h, and ~239+/−15 micRem/h, respectively. These results are well within ~2-3% of each other.

Example 3: Rapid, single Pneg based H*10 dosimetry in 50× higher dose rate (10-20,000 micRem/h; i.e., 10-20 mRem/h) fields than for Example 2. As is well-known dose rates in the multi-mRem/h level are often encountered in the nuclear industry workplace for radiation workers who must conduct work for limited periods of time and require survey equipment for planning. This example shows how, once the neutron spectrum is generally established (e.g., one knows what type of neutron sources are present for which the spectrum is pre-established as in Example 2) and the associated CTMFD with its RM is in place, one may then utilize a single CTMFD to survey the environment at a single Pneg state acquiring detection rate data and then obtaining the H*10 neutron dose rate. The same Cf-252 source used in Example 2 was simply brought closer (to ~15 cm from the previous ~123 cm) to the CTMFD operating at a single predetermined Pneg such that the detection rate is at/under ~10 cpm. Since neutron flux increases roughly as $1/r^2$, the new dose rate would now by higher by a factor of ~60-70× [=(123/15)$^2$] towards about 16-17 mRem/h. Indeed, the measured value at a single Pneg state amounted to ~15+/−3 mRem/h. This is well in line with expectations when considering 3-D effects which the CTMFD takes into account. Any size SV CTMFD may be practically used once their RM and, efficiency vs Pneg are established per this specification. The determination of what Pneg state to acquire data is dependent on the efficiency vs Pneg. For example, with a 16 cc SV, the efficiency varies by 100× as: ~25% at Pneg=9 bar; ~2.5% at 5 bar; ~0.25% at 3 bar and so on. For an unknown intensity the 16 cc SV CTMFD would sweep the Pneg field such that the detection rate is just under a comfortably below saturation value of 10 cpm after which about 5-10 DEs (in under 1 min.) are recorded and then scaled accordingly with the efficiency curve for any given spectrum—needing only the already developed RM for that specific CTMFD, and offering results within tens of seconds.

Figure 8:
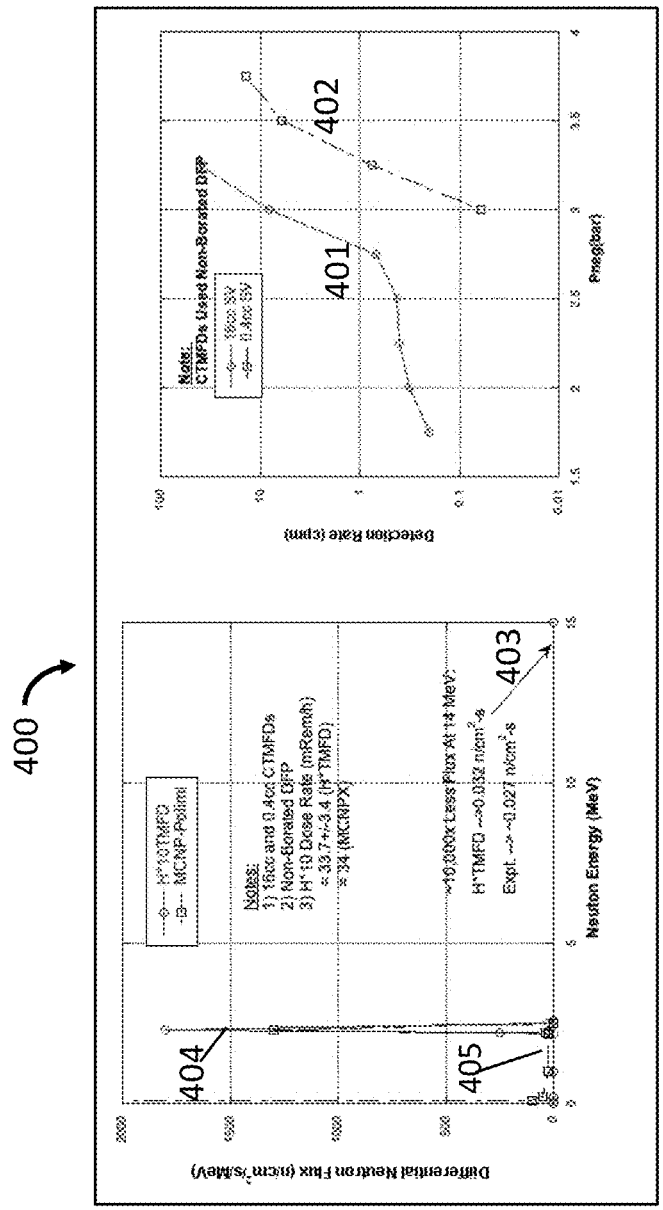
FIG. 8 shows fast neutron spectroscopy and H*10 neutron dosimetry for pulsed D-D accelerator generated extremely skewed (10,000:1) intensity mixed neutron energy field comprising 2.5 MeV and 14 MeV neutron emissions.

Example 4: H*10 spectrometry and dosimetry in mixed 2.5 MeV and 14 MeV accelerator generated neutron field and comparison against BSS measurements. In many industrial (e.g., medical, high-energy physics, active neutron-based interrogation scenarios such as for illicit cargo detection) accelerator based monoenergetic neutron sources are employed. Commonly used are monoenergetic 2.45 MeV (D-D fusion) and 14 MeV (D-T fusion) neutron generating devices. The D-D fusion pathway results in production and buildup of tritium (T) isotopes which can then produce 14 MeV neutrons together with 2.45 MeV neutrons. Unless the T buildup is excessive (e.g., over long-term operation) the relative intensity of 14 MeV neutrons is usually a small fraction of the total neutron output. In this example, a Karman-Science A711 D-D accelerator device producing ~5×10$^7$ n/s (2.45 MeV neutrons and a 10,000× lower intensity 14 MeV neutron) was examined as a challenge situation for ascertaining if the H*TMFD architecture as described in this application could accurately capture the spectrum comprising 2 main energy peaks of 10,000:1 in relative intensity, and estimate the H*10 neutron dose correctly in comparison against an MCNP based simulation of the experiment—together with comparison against the industry's BSS standard. The D-D accelerator's 14 MeV intensity was verified against Al foil activation data and determined to be 0.009%. FIG. 8 depicts the results. 400 A 2-CTMFD array was placed at a 105° angle from the D-D accelerator head (where the neutron energy ~2.3 MeV) at a distance of ~150 cm. The 15 cc CTMFD was operated to determine 401 the detection rate of neutrons for seven Pneg states in 0.25 bar increments ranging from 1.5 bar (at which point the 14 MeV neutron threshold is reached) towards ~3 bar (the approximate threshold for 2.5 MeV neutrons). The 0.4 cc CTMFD was operated similarly at four Pneg states ranging from 3 bar to about 3.75 bar to cover the 2-3 MeV range. 402 Using the already developed RMs for each of the two SV CTMFDs, the H*10 (ICRP-74 table based) dose estimates from H*TMFD and MCNPX-Polimi were found to be ~33.7+/−3.4 mRem/h and, ~34+/−0.04 mRem/h, respectively. The H*TMFD system predicted the intensity of the 14 MeV neutrons 403 to be 0.014% of the total which is very close to the separate experimentally validated estimate of 0.009%. The MCNPX-Polimi results indicate a 2.3 MeV neutron fluence of ~151 n/cm$^2$-s whereas, the H*TMFD system predicted it to be ~223 n/cm$^2$-s (principally because the epithermal neutron component is all included in the fast energy bins). 404-405 In stark contrast, the Ludlum BSS using 5 HDPE spheres (OD=2", 3", 5", 8" and 10") failed to provide meaningful results. The main peak energy is predicted to be at 3 MeV vs 2.3 MeV (actual), the predicted H*10 neutron dose is ~100% higher than the MCNPX-Polimi predicted dose estimate. Importantly, the BSS system completely failed to predict the presence of the 10,000× lower intensity 14 MeV neutron component; instead, predicted for the unrealistic presence of multiple ~10 smaller (2-3%) peak than the main 2.3 MeV peak as occurring between 3-11 MeV. While the Ludlum BSS system operated well (albeit, much slower than the H*TMFD system) for continuous neutron energy spectra sources like Cf-252 and Pu—Be/Am—Be sources in 100+ micRem/h fields as discussed earlier in Examples 1-3, the industry standard BSS couldn't do so for accelerator driven monoenergetic energy sources—unlike the H*TMFD system of this disclosure which succeeded in doing so. This example presents further evidence of the utility of the as-devised H*TMFD architecture and method.

The following references relate to the present disclosure, entirety of which is incorporated herein by reference into the present disclosure.

Those skilled in the art will recognize that numerous modifications can be made to the specific implementations described above; the implementations should be limited to the particular limitations described. Other implementations may be possible.

REFERENCES

[1] Rusi Taleyarkhan, J. Lapinskas, Y. Xu, Tensioned metastable fluids and nanoscale interactions with external stimuli—Theoretical-cum-experimental assessments and nuclear engineering applications, Nucl. Eng. Des. 238 (7) (2008) 1820-1827.

[2] T. F. Grimes, J. A. Webster, B. A. Archambault, R. P. Taleyarkhan. Applications of Tension Metastable Fluid Detectors in Active Neutron/Photon SNM Interrogation Systems, IEEE, HST Conference Transactions, Paper 46, 978-1-4799-1737-2/15, 2015.

[3] Frederick Seitz, On the theory of the bubble chamber, Phys. Fluids (1958-1988) 1 (1) (1958) 2-13.

[4] C. D. West, Cavitation Bubble Nucleation by Energetic Particles, Oak Ridge National Laboratory, Oak Ridge, Tenn., 1998, No. ORNL/TM-13683.

[5] T. F. Grimes, J. A. Webster, B. A. Archambault, R. P. Taleyarkhan. Applications of tension metastable fluid detectors in active neutron/photon SNM interrogation systems, Poster Session IEEE HST 2015 Conference, 2015.

[6] Glenn F. Knoll, Radiation Detection and Measurement, John Wiley & Sons, 2010.

[7] L. Briggs, A new method for measuring the limiting negative pressure in liquids, Science. 109 (1949) 440.

[8] James F. Ziegler, Matthias D. Ziegler, Jochen P. Biersack, SRIM—The stopping and range of ions in matter (2010), Nucl. Instrum. Methods Phys. Res. Sect. B: Beam Interact. Mater. Atoms 268 (11) (2010) 1818-1823.

[9] T. F. Grimes, et al. Gamma-blind transformational nuclear particle sensors, IEEE HST Conference Transactions, 978-1-4673-2709-1/12, 417-422, 2012.

10] Sara A. Pozzi, Enrico Padovani, Marzio Marseguerra, MCNP-PoliMi: a Monte-Carlo code for correlation measurements, Nucl. Instruments Methods Phys. Res. Sect. A: Accel. Spectrom. Detect. Assoc. Equip. 513 (3) (2003) 550-558.

[11] R. S. Sanna, A Manual for BON: A Code for Unfolding Multisphere Spectrometer Neutron Measurements, EML-394, August 1981.
[12] Brian Bradie, A Friendly Introduction to Numerical Analysis, Pearson Prentice Hall, Upper Saddle River, N J, 2006.
[13] A. J. Mason, OpenSolver—an open source add-in to solve linear and integer progammes in excel, Operations Research Proceedings 2011, 2012. pp. 401-406.
[14] T. F. Grimes, Nucleation and Detection in Tensioned Metastable Fluids (Ph.D. dissertation), Purdue University, 2015.
[15] ANSI, American National Standard Performance Criteria for Spectroscopy-Based Portal Monitors Used for Homeland Security, Technical Report ANSI 42.35, American Nuclear Standards Institute, Washington, D.C., 2007.

The invention claimed is:

1. A portable system for detecting neutrons comprising:

a detector liquid in a first enclosure having walls and a venturi valve system such that the detector liquid can pass therethrough during detector operation, the enclosure affixed to a spinning mechanism for introducing negative pressure in the degassed detector liquid, wherein:

the spinning mechanism is capable of inducing a tensioned negative pressure ($P_{neg}$) in the degassed detector liquid such that neutron detection can occur in the degassed detector liquid at negative pressure and configured to detect neutron-caused vapor pocket corresponding to neutron counts, wherein:

detection for fast neutrons is based on $[EV]=[RM]\times[NE]$, where EV is a vector matrix of results of relative detection time for a range of $P_{neg}$ values obtained experimentally by placing one or more neutron detectors equidistant from an unknown neutron source, NE is a neutron energy vector, RM is a response matrix representing a probability matrix for detecting a neutron at a plurality of $P_{neg}$ values, and $P_{neg}$ is the tensioned negative pressure; and wherein detection of epithermal neutrons is based on a single energy bin for which at least one doped CTMFD is used to derive a count rate which is related to a conversion factor to derive a dose rate.

2. The system of claim 1, wherein the detector liquid has been degassed through mote control, removal of dissolved gases, avoidance of gas ingress, and sealing for allowing long term false positive avoided operation.

3. The system of claim 1, wherein the system operates over various segmented Pneg ranges for deployment of various sized SV CTMFDs enables H*10 dosimetry and neutron spectrometry for continuous neutron spectra as from fission reactors, spontaneous fission and/or ($\alpha$, n) reactors, and mixed field monoenergetic neutron beams from accelerator driven neutron generators.

4. The system of claim 1, wherein the one or more neutron detectors are placed side-by-side on a rotating platform.

5. The system of claim 1, wherein the at least one doped CTMFD comprises a borated liquid comprising methanol, DFP, and TMB.

6. The system of claim 1, wherein the one or more neutron detectors are stacked vertically on a rotating platform.

7. The system of claim 1, wherein the one or more neutron detectors comprise at least one of the following: at least one doped neutron detector and at least two non-doped neutron detectors placed on a rotating platform.

8. The system of claim 1, further comprising a safety enclosure comprising a material configured to prevent light photon interference.

9. The system of claim 8, wherein the safety enclosure comprises an acrylic material.

* * * * *